United States Patent
Haug et al.

(10) Patent No.: US 7,774,530 B2
(45) Date of Patent: Aug. 10, 2010

(54) ARBITRATION OF MEMORY TRANSFERS IN A DSP SYSTEM

(75) Inventors: Stuart Haug, Hackensack, MN (US); Chad Wolter, Breezy Point, MN (US); Damian Bonicatto, Pequot Lakes, MN (US); Verne Olson, Pequot Lakes, MN (US); Robert Zeppetelle, Brainerd, MN (US); Matt Tilstra, Minneapolis, MN (US)

(73) Assignee: Hunt Technologies, LLC, Alpharetta, GA (US)

( * ) Notice: Subject to any disclaimer, the term of this patent is extended or adjusted under 35 U.S.C. 154(b) by 90 days.

(21) Appl. No.: 12/134,821

(22) Filed: Jun. 6, 2008

(65) Prior Publication Data

US 2008/0307136 A1    Dec. 11, 2008

Related U.S. Application Data

(60) Provisional application No. 60/942,221, filed on Jun. 6, 2007.

(51) Int. Cl.
G06F 13/00 (2006.01)
G06F 15/00 (2006.01)

(52) U.S. Cl. .......................... 710/110; 712/31
(58) Field of Classification Search .............. 710/110; 712/31
See application file for complete search history.

(56) References Cited

U.S. PATENT DOCUMENTS

| | | | | |
|---|---|---|---|---|
| 4,760,521 A | * | 7/1988 | Rehwald et al. | 711/106 |
| 5,182,808 A | * | 1/1993 | Bagnoli et al. | 710/119 |
| 5,276,886 A | * | 1/1994 | Dror | 710/240 |
| 5,878,240 A | | 3/1999 | Tomko | |
| 6,278,357 B1 | | 8/2001 | Croushore et al. | |
| 6,473,849 B1 | | 10/2002 | Keller et al. | |
| 6,496,740 B1 | * | 12/2002 | Robertson et al. | 700/20 |
| 6,567,881 B1 | * | 5/2003 | Mojaver et al. | 710/313 |
| 6,925,641 B1 | * | 8/2005 | Elabd | 718/101 |
| 7,006,521 B2 | * | 2/2006 | Nguyen et al. | 370/462 |
| 7,124,224 B2 | * | 10/2006 | Tu et al. | 710/200 |
| 7,325,122 B2 | * | 1/2008 | Abdelilah et al. | 712/14 |
| 7,464,208 B2 | * | 12/2008 | Tu et al. | 710/200 |
| 7,519,780 B2 | * | 4/2009 | DeMent et al. | 711/151 |
| 7,519,793 B2 | * | 4/2009 | Abdelilah et al. | 712/14 |
| 2002/0057711 A1 | * | 5/2002 | Nguyen et al. | 370/462 |
| 2005/0020232 A1 | | 1/2005 | Bonicatto et al. | |
| 2005/0188129 A1 | * | 8/2005 | Abdelilah et al. | 710/52 |
| 2008/0010390 A1 | * | 1/2008 | Abdelilah et al. | 710/52 |
| 2008/0072005 A1 | * | 3/2008 | Abdelilah et al. | 711/165 |

OTHER PUBLICATIONS

International Search Report and Written Opinion, dated Sep. 9, 2008.
European Search Report, dated Nov. 6, 2008.

* cited by examiner

*Primary Examiner*—Ryan M Stiglic
(74) *Attorney, Agent, or Firm*—Thomas, Kayden, Horstemeyer & Risley, LLP

(57) ABSTRACT

Disclosed are various embodiments for arbitration of memory transfers in a digital signal processing system. In one embodiment, a digital signal processing system includes a plurality of DSP's having an external memory. The DSP's are further configurable to act as a master processor and a slave processor relative to another DSP. The system also includes an arbiter configured to maintain DSP status data and arbitrate requests between master processors and slave processors in the system.

20 Claims, 6 Drawing Sheets

ARBITRATION OF MEMORY TRANSFERS IN A DSP SYSTEM

CROSS REFERENCE TO RELATED APPLICATION

This application claims priority to U.S. Provisional Application Ser. No. 60/942,221, filed Jun. 6, 2007, which is hereby incorporated by reference herein its entirety.

TECHNICAL FIELD

The disclosure relates generally to a power distribution system, and more specifically, to communications over distribution lines in a power distribution system.

BACKGROUND

In a power distribution system, substantial digital signal processing may be utilized to conduct data communications between endpoints and a distribution substation, central office, billing center, or the like. Processing data received from hundreds or thousands of endpoints in a power distribution system on a three phase waveform may utilize considerable digital signal processing (DSP) resources. Consequently, communication of data between multiple DSP's employed to process a three phase waveform becomes increasingly complex as the number of DSP's increases.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Figure 1:
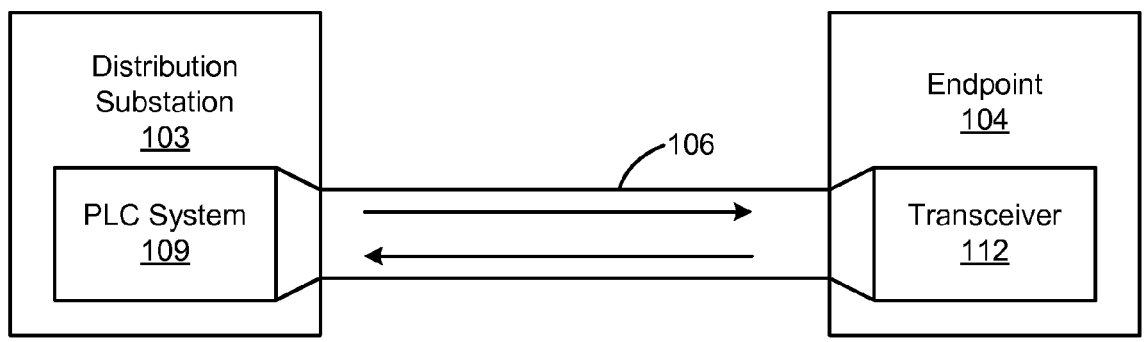
FIG. 1 depicts a distribution substation and an endpoint according to an embodiment of the disclosure.

With reference to FIG. 1, shown is a block diagram of one link of an exemplary power distribution system 100 distributing power between a distribution substation 103 and an endpoint 104, which can be incorporated with a customer device and/or electrical system at a power consumer's premises or site. The power distribution system 100, or distribution plant as it is sometimes referred to, can be that part of an electric power system that receives power from a power generator via high-voltage transmission lines, reduces or steps down the voltage, and then distributes the power to an endpoint 104 at the premises of a power consumer. Within the power distribution system 100, distribution lines may conduct electricity from the distribution substation to the endpoints. Distribution lines may include underground cable, aerial cable, or overhead open-wire conductors carried on poles, or some combination thereof.

Depending on the particular configuration, there may be one or more layers of distribution substations 103 connected in series between the power generator and the endpoint 104, where each consecutive distribution substation further steps down the voltage of the electricity being transmitted. Additionally, the depicted distribution substation 103 can also represent any other central office, data center, and/or other supplier infrastructure used to deliver electricity, telecommunications services, phone, internet, or other services. As a non-limiting example, the depicted distribution substation 103 can be replaced and/or supplemented with a digital subscriber line access multiplexer (DSLAM) implemented in accordance with the same or analogous principles as disclosed herein.

Additionally, the power generators, distribution substations 103, and endpoints 104 may be organized in a network where the various power generators supplying power can be taken on or off line and the distribution substation (through which a particular endpoint receives its electricity) can be changed without a loss or interruption of power. Distribution transformers (not shown) may be connected in the distribution line between the distribution substation 103 and the endpoint 104, which the distribution transformers serve to further step-down the voltage to a level that is used by consumers. These step-down transformers, often referred to as pole transformers may be configured to supply a consumer or group of consumers with electricity over a secondary circuit. Each consumer may be connected to the secondary circuit through its service leads and meter.

The distribution substation 103 shown in FIG. 1 may be configured to provide power to a consumer device (not shown) and/or endpoint 104 via a distribution line 106. The distribution line 106 may be coupled to one or more step-down transformers before reaching the depicted endpoint 104. The distribution line 106 may be configured to receive power from the distribution substation 103 and provide at least a portion of that power to the endpoint 104. For a variety of reasons, it may be desirable to communicate information from the distribution substation 103 to one or more endpoints, such as the endpoint 104. As a non-limiting example, it may be desirable to control and/or monitor a usage metering device, which may be located at or near the endpoint 104 to determine the power consumption at the endpoint 104. Additionally, control information may be configured to provide the ability to control and/or alter the operation of the usage metering device and/or individual loads at the customer premise. As an additional non-limiting example, other services aside from power, such as telecommunications, internet, and/or other data services can also be provided via the distribution line and may utilize bi-directional communication between the distribution substation 103 and endpoint 104.

Other more general information, including, but not limited to, information to display or store the price of power at the customer premise, the date and time, the temperature and/or other information capable of being received and translated at the customer premise may also be transmitted along the distribution line. As a non-limiting example, the time displayed on an electronic device at the customer premise could be periodically adjusted to display an accurate time as transmitted by the utility station.

As three phase electronic power systems can be frequently employed for power distribution, such power systems can include three conductors carrying time offset waveforms. Accordingly, data can be transmitted via three substantially identical waveforms that can be reconciled by a transceiver, and/or data can be separately transmitted in each of the three waveforms. Data can be embedded in any or all of the waveforms by employing frequency-shift keying (FSK) or other modulation schemes that should be appreciated whereby digital information can be transmitted on any or all of the waveforms employed in a power distribution system that may act as a carrier wave in such a scheme.

Various embodiments disclosed herein may be configured to communicate control signals and general information signals to endpoints 104 via the distribution line 106 to control customer devices and provide more general information to the customer. Information from the customer device also may be sent via the distribution line 106 to the distribution substation 103, thereby creating a two-way or bi-directional communications link via the distribution line 106. The aforementioned examples of control signal applications where control signals (and/or general information signals) are provided by the distribution substation to an endpoint 104 are merely representative of the various uses that such control signals provide. Therefore, the examples provided herein are merely exemplary, as the disclosed embodiments are not limited to the transmission of any particular signal or service.

In providing control information and/or other data at the distribution substation 103, a power line carrier (PLC) transceiver 109 is used to drive control signals and/or other data along the distribution line 106 to an endpoint transceiver 112 at the endpoint 104. The endpoint transceiver 112 may be configured to recognize the signals transmitted by the PLC transceiver 109. Similarly, the PLC transceiver 109 may be configured to receive information transmitted on the distribution line 106 from the endpoint transceiver 112.

The electrical distribution system 100 including the distribution line 106 may be configured to provide a full-duplex or bi-directional link between the distribution substation 103 and the endpoint 104. Full duplex in this non-limiting example may refer to simultaneous (and/or substantially simultaneous) communications in both directions, although the information sent in one direction may travel at a speed different from that of the information provided in the opposite direction. This full-duplex link via the distribution line 106 may be configured to provide for transmission of control information, without the need for additional wiring over and above such a distribution line 106 that may be utilized for the transmission of electrical power.

It should be appreciated that the depicted electrical distribution system 100 of FIG. 1 is merely a depiction of a single exemplary link in such a system. It should further be appreciated that additional complexities utilized for the bulk distribution of electricity or other services can be incorporated into an embodiment of the present disclosure.

Figure 2:
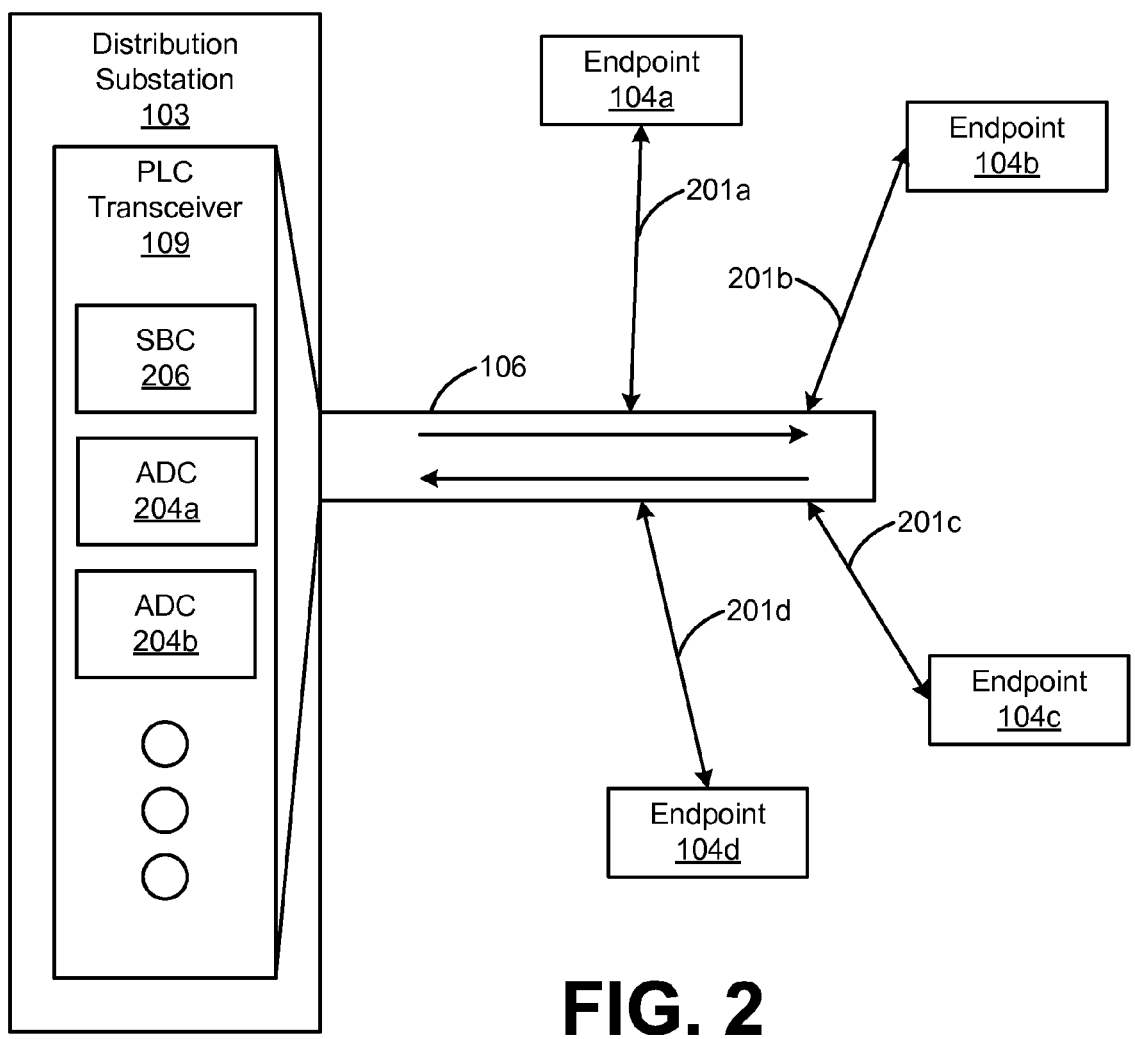
FIG. 2 depicts another exemplary embodiment of a distribution substation and multiple endpoints.

With reference to FIG. 2, shown is an alternative depiction of a distribution substation 103 in accordance with the disclosure. It should be noted, as is depicted in FIG. 2, that in operation, a distribution substation 103 can be coupled to more than one endpoint 104. As a non-limiting example, a distribution substation 103 may be coupled to hundreds or thousands of endpoints 104 configured in a unidirectional or bidirectional communications link over a distribution line 106. It should also be noted that in a multiple endpoint 104 configuration, various wiring configurations can be employed to connect a distribution substation 103 to endpoints 104. As a non-limiting example, in the depicted environment of FIG. 2, a main distribution line 106 as well as various spoke distribution lines 201 are employed to connect endpoints 104 to the distribution substation 103. However, alternative wiring schemes may also be employed. As an additional non-limiting example, the distribution substation 103 as well as endpoints 104 may be connected serially.

As the distribution substation 103 and multiple endpoints 104 can be configured to form a communication link therebetween via distribution line 106, a communications protocol can be established to substantially ensure that signals originating from one endpoint 104a do not interfere with those originating from another endpoint 104b. Accordingly, each endpoint 104 in such an environment can be assigned a channel in a frequency modulation scheme in which it may transmit data. As a non-limiting example, an endpoint 104 can be assigned an approximate 2-3 mHz channel within approximately 50 Hz to 60 Hz of bandwidth that is typically employed for power distribution.

Accordingly, the PLC transceiver 109 can communicate with each endpoint 104 individually by sending and/or receiving signals in a particular channel or frequency assigned to an endpoint 104. As noted above, there may be hundreds or thousands of endpoints 104 coupled to a distribution substation 103. A PLC transceiver 109 in accordance with embodiments of this disclosure are capable of interpreting and processing data that may be sent from multiple endpoints 104. Such processing of a three phase analog waveform can utilize substantial digital signal processing resources. Accordingly, the PLC transceiver 109 may include at least one advanced digital signal processing card (ADC) 204, which is configured to receive the three offset phases of a three phase signal from various endpoints 104 that are coupled to the distribution substation 103 or a subset thereof. The ADC 204 may be configured to receive, filter, and/or separate a predetermined frequency range (e.g. approximately a 60 Hz and/or 50 Hz range) into one or more channels that are assigned to various endpoints 104.

In one embodiment, the ADC 204 can include one or more digital signal processors that are configured to receive and/or process channels assigned to endpoints 104 that are encoded in an analog waveform. As another non-limiting example, an ADC 204 can include a plurality of digital signal processors that can receive the various phases of a three phase waveform embedded with encoded data from a plurality of endpoints 104 and extract at least one channel of data corresponding to the various endpoints 104 in an environment such as depicted in FIG. 2. As the communications theories employed to extract such various channels of digital data from an analog waveform should be appreciated by one of ordinary skill in the art, further detail need not be discussed herein.

A PLC transceiver 109 can further include one or more ADC's 204 to perform digital signal processing to receive and/or process signals received from other and/or additional endpoints 104. As a non-limiting example, the distribution substation 103 and PLC transceiver 109 may be coupled to a number of endpoints 104 that is greater than can be handled by a single ADC 204; therefore, additional ADCs 204 may be incorporated into a PLC transceiver 109.

A PLC transceiver 109 may further include a single board computer (SBC) 206 and/or other device that can handle higher level tasks of a distribution substation 103 aside from the digital signal processing operations of the ADC's 204. As a non-limiting example, the SBC 206 may be configured to receive digital signals extracted by the ADC's 204 corresponding to each endpoint 104 coupled to a distribution substation 103. Such data can include, but is not limited to: metering data, outage data, status information and other data. Accordingly, the SBC 206 can process such data for billing, maintenance or other purposes. As an alternative non-limiting example, SBC 206 can forward such data to central billing and/or operations systems for such processing.

Additionally, SBC 206 can issue commands to ADC's 204 of the PLC transceiver 109. As a non-limiting example, an SBC 206 can configure digital signal processing resources of an ADC 204 by initiating a software flash and/or other programming processes of one or more digital signal processors or other programmable components residing on an ADC 204.

Figure 3:
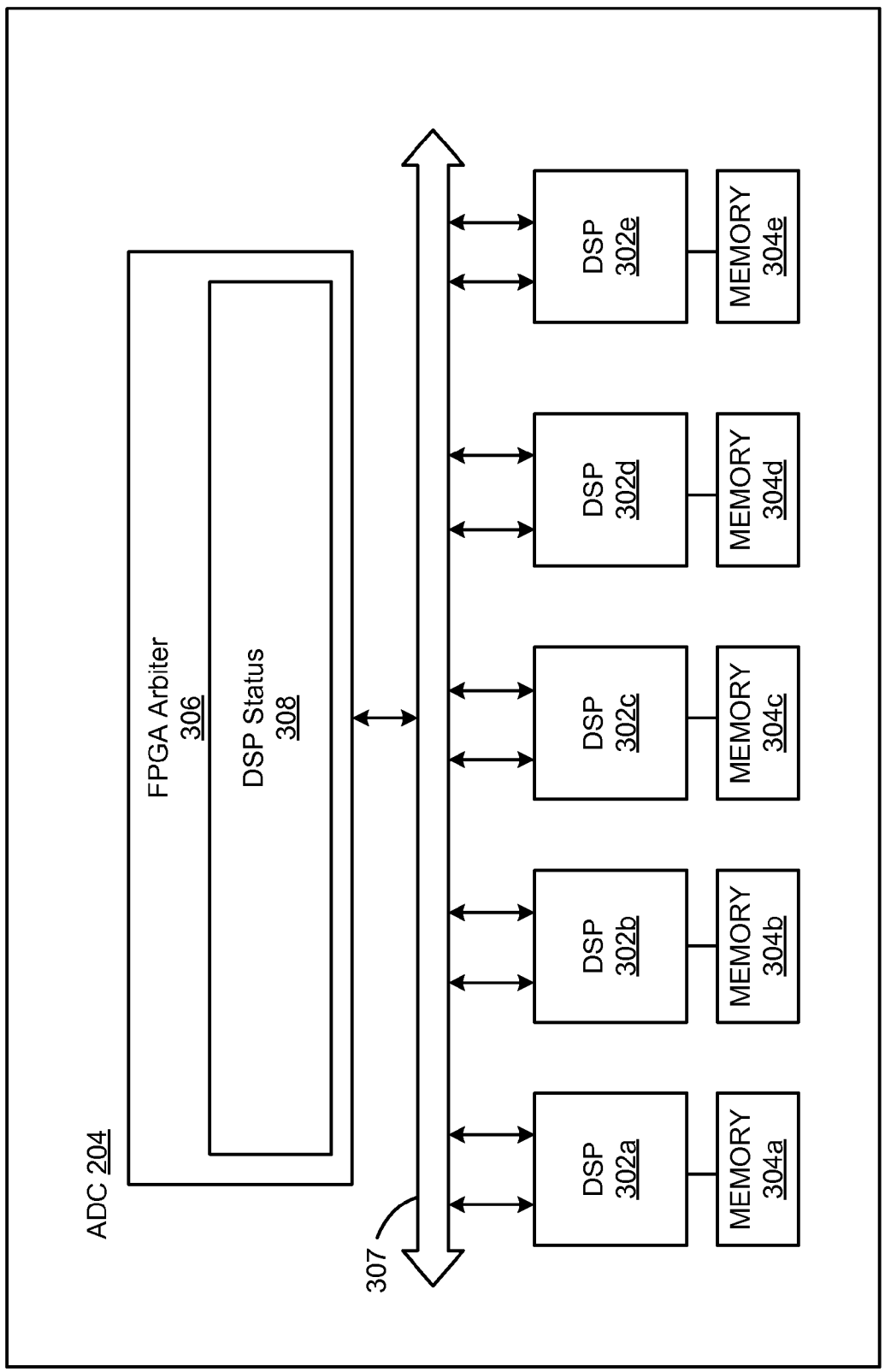
FIG. 3 depicts an exemplary embodiment of an advanced digital signal processing card.

Reference is now made to FIG. 3, which depicts a non-limiting exemplary embodiment of an ADC 204. The depicted ADC 204 includes multiple digital signal processors 302 that are coupled to a corresponding memory 304. One or more of the digital signal processors 302 may be configured to perform at least a portion of tasks for receiving and processing data from various endpoints 104 (FIG. 1) in a power distribution system. As noted above, as there may be hundreds or thousands of endpoints 104 in such a system, each of which can be assigned a channel in a three phase waveform, substantial digital signal processing resources may be desired to receive and extract digital signals corresponding to the endpoints 104 in the system.

Accordingly, the ADC 204 can include one or more "off the shelf" DSP's that are configured and/or programmed in a way to divide digital signal processing tasks necessary to extract at least one channel of data from a three phase waveform used in a power distribution system. Additionally, each digital signal processor 302 may possess an internal memory or can be configured with an external memory for the purpose of assisting with the digital signal processing of signals received from a distribution line 106 (FIG. 1).

Because such division of labor may be employed in the ADC 204 among the digital signal processors (DSP) 302, the various digital signal processors 302 may also be configured to communicate data among one another. As a non-limiting example, if the DSP's 302 of an ADC 204 are configured to perform piecewise processing of a signal in an assembly line fashion in order to isolate channels embedded therein, it may be desired to transmit data from one DSP (e.g. 302*a*) to another DSP (e.g. 302*b*) in the ADC 204. Consequently, the DSP's 302 of the ADC 204 can transmit data among one another to facilitate digital signal processing necessary to process signals on a distribution line 106.

More specifically, the digital signal processors 302 may be configured to access the memory 304 of other digital signal processors 302 in an ADC 204. As a non-limiting example, the DSP 302*a* can be configured to access the memory 304*b* that is coupled to the DSP 302*b*. Such access can include writing and/or reading data from or to the memory 304*b*. In the above non-limiting example, the DSP 302*a* is configured to act as a master processor with reference to the DSP 302*b*, as it has access to the memory of the DSP 302*b*. Additionally, the DSP 302*b* can be likewise configured to access the memory 304*a* that is coupled to DSP 302*a*. Therefore, DSP's 302*a* and 302*b* (or any of the DSP's in the ADC 204) can be configured as a master processor and a slave processor by accessing memory of another DSP while substantially simultaneously providing access to its own memory.

As an additional non-limiting example, DSP 302*a* may be configured as a master processor relative to DSP 302*b* and a slave processor relative to a third DSP, such as DSP 302*c*. Whether a DSP requires configuration as a master processor and/or a slave processor relative to another DSP may be dependent on configuration or programming of the DSP's and the tasks performed by each in order to process a three phase waveform in a power distribution system. In other words, each DSP 302 in an ADC 204 can be configured to act as a master processor and/or a slave processor relative to any other DSP 302 in the system. In addition, a DSP configured as a slave processor relative to a first DSP may not be simultaneously configured as a slave processor relative to a second DSP. In other words, a master processor should have exclusive access to the memory of a slave processor relative to other potential master processors in the system.

Because each DSP 302 of the ADC 204 can be configured as a master processor or a slave processor relative to any other DSP 302 in the system, fabrication of such a system can be facilitated with the use of a field programmable gate array (FGPA) arbiter 306 that can arbitrate and/or route such requests and data transfers among the DSP's 302. Rather than wiring individual DSP's 302 to one another directly, the ADC 204 employs FPGA arbiter 306 and bus 307 to facilitate the flexible master-slave architecture of the ADC 204 disclosed herein. To this end, the FPGA arbiter 306 maintains DSP status 308, which, for at least one of the DSP's 302 in an ADC 204, includes data regarding whether a DSP is presently claimed as a slave processor by another DSP in the ADC 204. In other words, if a particular DSP 302 is claimed as a slave processor, the DSP can cause the FGPA arbiter 306 to reflect that it is presently exclusively claimed as a slave processor by another DSP acting as a master processor. Additionally, the DSP status 308 includes data regarding which DSP 302 in the ADC 204 has exclusively claimed a DSP as a slave processor.

Therefore, if a DSP 302 attempts to claim another DSP 302 in an ADC 204 as a slave processor, the requesting DSP 302 can make such a request to the FPGA arbiter 306, which can, on the basis of the DSP status 308 grant and/or reject the request based upon whether the requested DSP is presently busy or claimed as a slave processor by another DSP in the system. As a non-limiting example, if DSP 302*a* wishes to claim DSP 302*b* as a slave processor, DSP 302*a* can request to claim DSP 302*b* by submitting a request to the FPGA arbiter 306. If DSP status 308 reflects that DSP 302*b* is not busy and not claimed as a slave processor by another DSP, the FPGA arbiter 306 can reserve DSP 302*b* as a slave processor for DSP 302*a* and update DSP status 308 accordingly. As a result, DSP 302*a* can act as a master processor relative to DSP 302*b* and access memory 304*b* for digital signal processing operation of the ADC 204. When DSP 302*a* has completed acting as a master processor relative to DSP 302*b*, it can inform the FPGA arbiter 306, which can update DSP status 308 accordingly, or "release" DSP 302*b* for claiming as a slave processor by any DSP 302 in the ADC 204.

The above non-limiting examples describing interactions between various DSP's 302 in an ADC 204 are merely exemplary and other permutations of DSP's acting as a master processor and/or slave processor are possible depending on the particular configuration.

In facilitating the above-described flexible master-slave architecture, one or more of the DSP's 302 in the ADC 204 has a master port 310 and a slave port 312. As a non-limiting example, the master port 310 may include a port through which the DSP 302 may access memory of another DSP in an ADC 204, and a slave port 312 is a port through which a DSP 302 allows access to its own memory. Therefore, as noted above, such discrete master port 310 and slave port 312 allows a DSP 302 to substantially simultaneously act as a master processor and a slave processor through its respective master port 310 and slave port 312.

Figure 4:
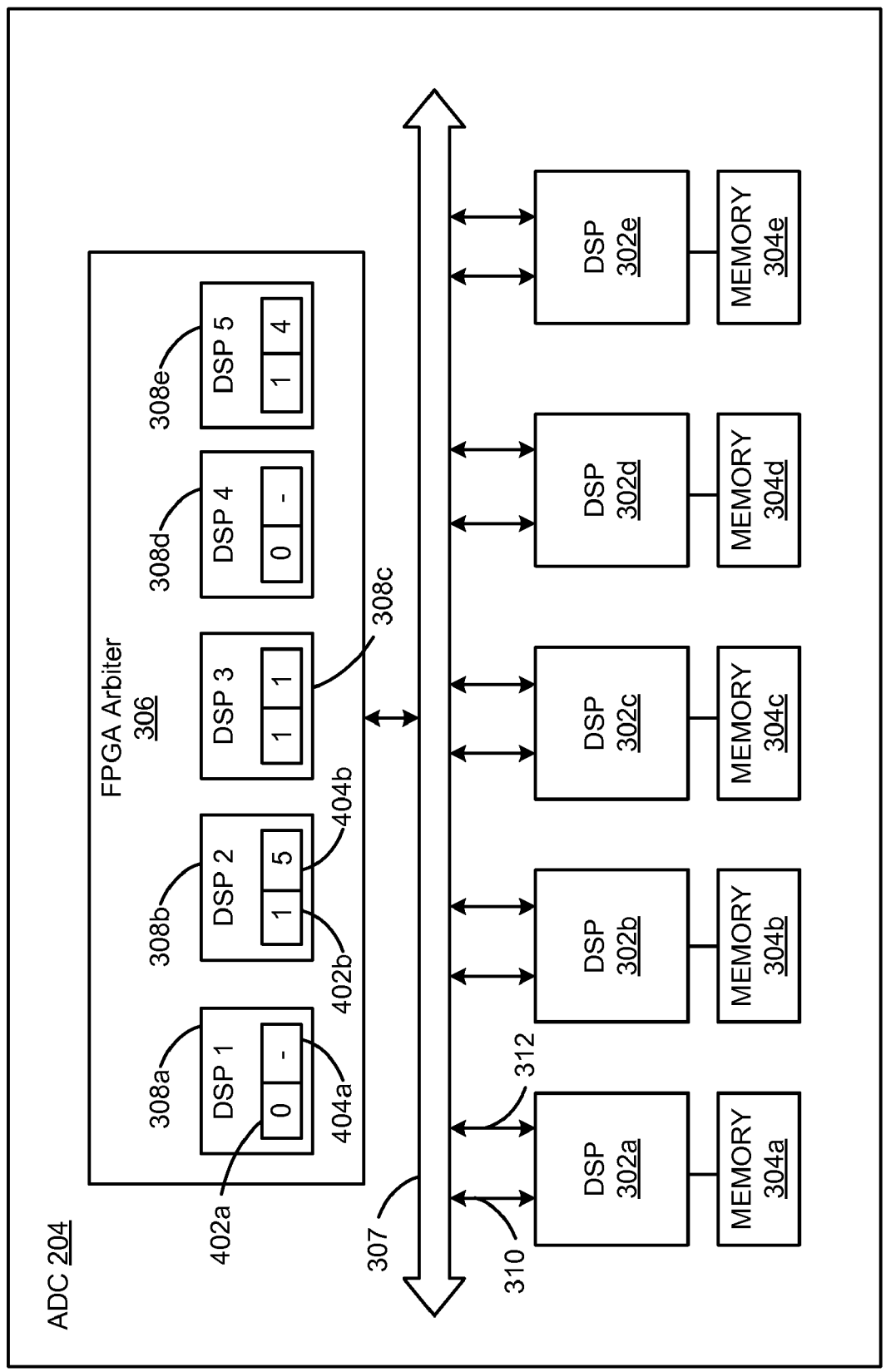
FIG. 4 depicts an alternative illustration of an advanced digital signal processing card.

Reference is now made to FIG. 4, which depicts an alternative illustration of the ADC 204 (FIG. 2). In the depicted FIG. 4, a non-limiting example of an implementation of DSP status 308 (FIG. 3) is shown. As noted above, the FPGA arbiter maintains DSP status 308 regarding the DSP's 302 in an ADC 204 in order to arbitrate requests from DSP's 302 to claim other DSP'S in an ADC 204 as slave processors and further access memory of another DSP. Accordingly, in the depicted non-limiting example, the FPGA arbiter 306 includes DSP status 308 data for at least one of the DSP's 302 in the ADC 204. Each DSP status 308 entry includes a slave busy flag 402 that reflects whether a DSP 302 corresponding to the DSP status 308 entry is claimed by another DSP as a slave processor. In the depicted example, the DSP status 308*a* reflects that the DSP corresponding to the entry is not claimed as a slave processor. Therefore, slave busy flag 402*a* is cleared.

The DSP status 308 entries may further include a master identity field 404 that reflects the identity of a master processor that has claimed the DSP 302 corresponding to the DSP status 308 entry. In the depicted non-limiting example, master identity field 404*a* contains no meaningful data as slave busy flag 402*a* reflects that the corresponding DSP is not claimed as a slave processor. Master identify field 404*b* may be configured to reflect that the corresponding DSP is claimed as a slave processor by a DSP 302 in the ADC 204 corresponding to the value stored therein. Accordingly, the DSP corresponding to the value in master identity field 404*b* may act as a master processor and the FPGA arbiter 306 may be configured to not grant other DSP's 302 in the ADC 204 access to the memory 304 of the DSP 302 until the master processor relinquishes its claim as a master processor.

It should be again noted that the above non-limiting examples are but some possibilities of an implementation of DSP status 308. DSP status 208 can be implemented using various flags, registers and/or other structures that can be employed by the FPGA arbiter 306 to arbitrate requests by DSP's to communicate with other DSP's in the ADC 204.

Figure 5:
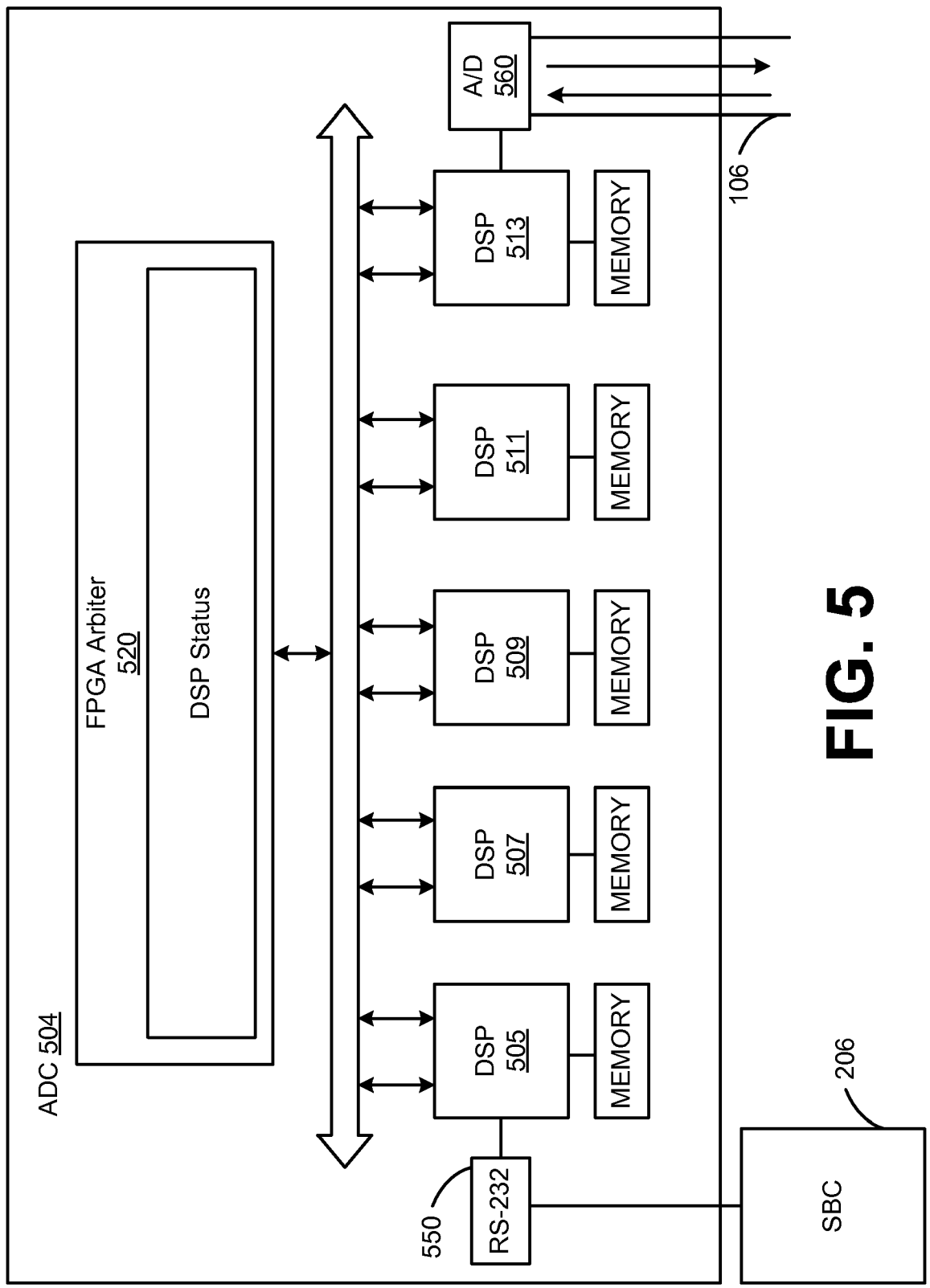
FIG. 5 depicts yet another alternative illustration of an advanced digital signal processing card.

Reference is now made to FIG. 5, which depicts an alternative illustration of an advanced digital signal processing card (ADC) 504. The depicted ADC 504 illustrates one non-limiting example of an implementation in a power distribution system 100 (FIG. 1), whereby the ADC 504 divides processing tasks necessary to receive and process a three phase waveform. As noted above, the ADC 504 is configured to process a three phase waveform having data from various endpoints in a power distribution system 100 embedded thereon. Because such a power distribution system may have hundreds or thousands of endpoints in communication with an ADC 504 residing in a distribution substation 103 and/or PLC transceiver 109, considerable digital signal processing tasks may be required in order to extract data from such a number of endpoints that can potentially transmit data embedded in a three phase waveform.

In the depicted non-limiting embodiment DSP 505 is configured to communicate with an RS-232 interface 550 with an SBC 206 that can be in a PLC transceiver 109. As noted above, the SBC 206 can perform various functions such as communicating with a central billing system, issuing commands and/or other directives to the ADCs in a PLC transceiver 109, and other tasks. In addition, the SBC 206 can configure and/or program the ADC 504 as well as the DSP's (505-513) and FPGA arbiter 520 residing thereon. This configuration and/or programming which can include issuing new software for flashing on a hardware device, information regarding endpoints, distribution line 106 conditions, and other data. It should also be noted that the DSP 505 may communicate with the SBC 206 via interfaces other than RS-232 interface 550, which may include, but are not limited to Ethernet or other serial and/or parallel data interfaces.

Accordingly, DSP 505 may be configured to act as a gateway to the SBC 206 for the ADC 504 as well as other hardware and software components thereon. Consequently, the DSP 505 may be configured to understand and/or execute a command set or other protocol necessary for such gateway communications. Additionally, the DSP 505 is further configured to translate and/or forward commands or data from the SBC 206 to other DSP's in the ADC 504, which can include but is not limited software to execute in the memory or flash memory of a DSP (505-513) or configuration data. Accordingly, DSP 505 may be configured to use the master-slave architecture facilitated by the FPGA arbiter 520 that allows it to claim other DSP's (507-513) in the ADC 504 as slave processors for the purpose of accessing memory of the DSP's (507-513). In addition, the DSP 505 can transmit digital data extracted from various channels of the three phase waveform received on a distribution line 106 to the SBC 206 via the RS-232 interface 550. As a channel can correspond to an endpoint 104 in the power distribution system, the SBC 206 can forward and/or further process the extracted data for billing, status, outage detection and/or other purposes.

DSP 513 in the depicted ADC 504 is configured to receive a three phase waveform on a distribution line 106 that is converted into digital signals by an analog to digital converter (A/D) 560. The A/D 560 is configured to receive three phases of a three phase waveform and convert the phases into a digital signal for processing by the ADC 504. The DSP 513 can perform digital signal processing tasks to begin the channel extraction process. As a non-limiting example, the DSP 513 can combine the three phases of the three phase waveform and filter the combined waveform such that extraneous data at frequencies above and below an area of interest are removed. As a non-limiting example, in a 60 Hz power distribution system, frequencies above and below a 60 Hz area of interest can be filtered from the combined waveform by DSP 513 so that channels can be extracted therefrom. Likewise, the same principle can be applied in a 50 Hz power distribution system, as frequencies above and below a 50 Hz area of interest can be filtered from the combined waveform. In this way, DSP 513 can perform such pre-processing (505-513) so that additional DSP's in the ADC 504 can further process the waveform to extract data from channels corresponding to endpoints in a power distribution system.

Accordingly, the DSP 513 can employ the master-slave architecture to send the filtered data to the remaining DSP's 507, 509, 511 to perform digital signal processing tasks to extract data corresponding to endpoints. As there may be hundreds or thousands of endpoints in a power distribution system, the DSP's 507, 509, 511 may be assigned various distinct portions of the filtered waveform received from DSP 513 to extract such data from channels assigned to various endpoints. As a non-limiting example, an endpoint can be an approximate 2-3 mHz channel of approximately 50 Hz or 60 Hz of bandwidth that can be employed for power distribution. The DSP's 507, 509, 511 can utilize the master-slave architecture of the ADC 504 to forward extracted channels to the DSP 505, which can forward the data in channels corresponding to power distribution system endpoints to the SBC 206 for additional processing for billing, metering, status, or other purposes.

Figure 6:
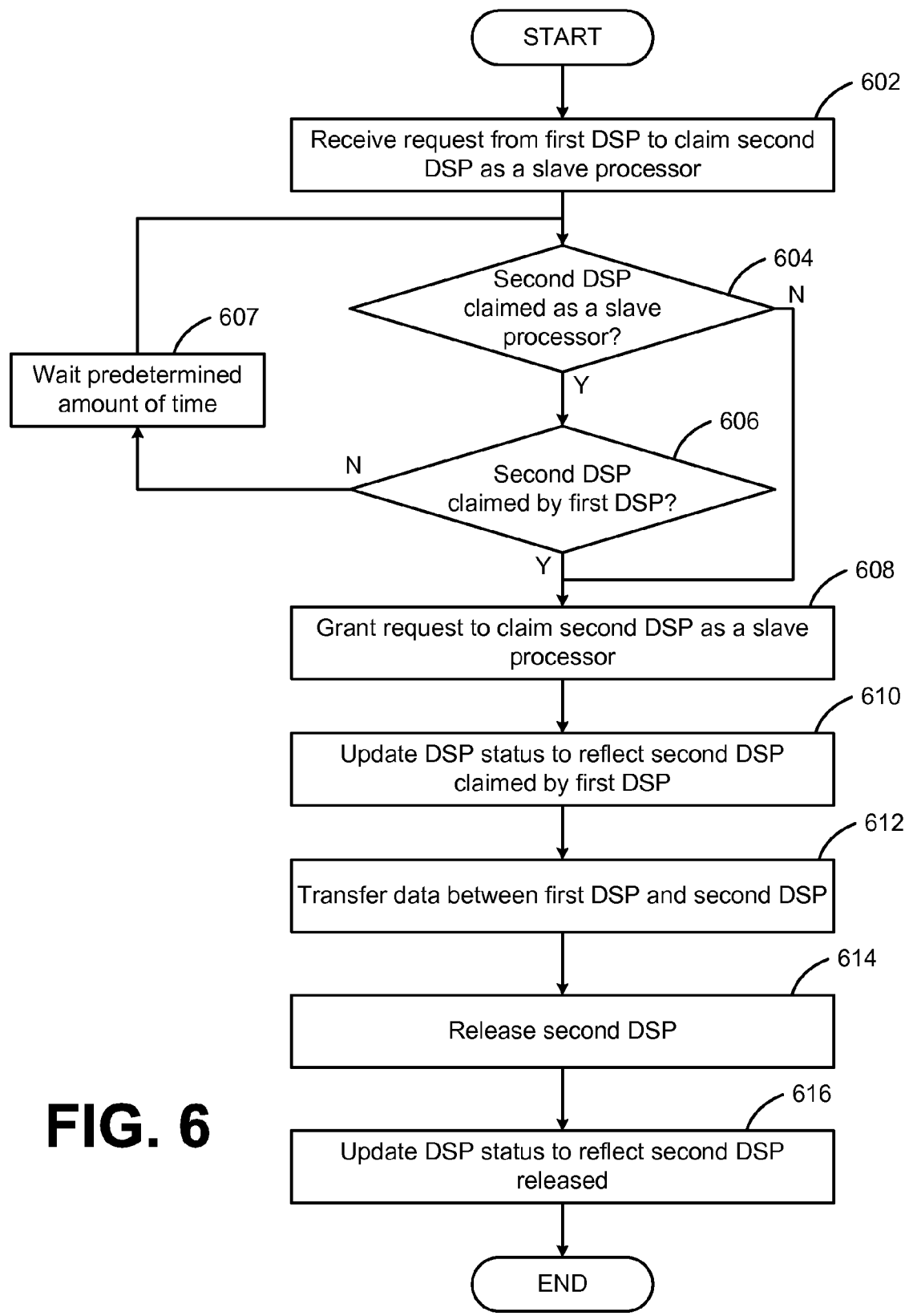
FIG. 6 depicts an exemplary embodiment of a process in accordance with the disclosure.

With reference to FIG. 6, shown is one example of a process in accordance with the disclosure. In box 602, a request is received from a first DSP 302/505 to claim a second DSP 302/513 as a slave processor. In other words, the first DSP 302/505 may request to be a master processor relative to the second DSP 302/513. As noted above, such a relationship grants the first DSP 302/505, as a master processor, exclusive access to alter the memory of the second DSP 302/513, as a slave processor. In box 604, it is determined whether the second DSP is already claimed as a slave processor by another DSP in an ADC 204/504, for example. Because the master-slave relationship gives a master processor exclusive access to the memory of a slave processor, a given slave processor can have no more that one master processor at a time.

In box 606, it is determined whether, if the second DSP 302/513 is already claimed as a slave processor, its master processor is the first DSP 302/505. If so, then the first DSP 302/505 can continue to have exclusive access to memory of the second DSP 302/513 as a master processor. If the first DSP 302/505 is not the master processor relative to the second DSP 302/513, then the master processor can wait in box 607 until the second DSP 302/513 is available to be claimed. In box 608, if the second DSP 302/513 is available to be claimed, then the request to claim it is granted by the arbiter 306/520. In box 610, the arbiter 306/520 updates DSP status data 308 to reflect that the slave processor is claimed and the identity of its master processor. In box 612, the arbiter 306/520 facilitates memory transfers between the first DSP 302/505 and second DSP 302/513 in the master-slave relationship.

In box 614, it is determined whether the master processor has released the slave processor so that it is available to be claimed by other DSP's 302/505-513 in an ADC, for example. If so, the arbiter 306/520 updates its DSP status 308 to reflect that the DSP 302/505-513 is available to be claimed as a slave processor.

Figure 7:
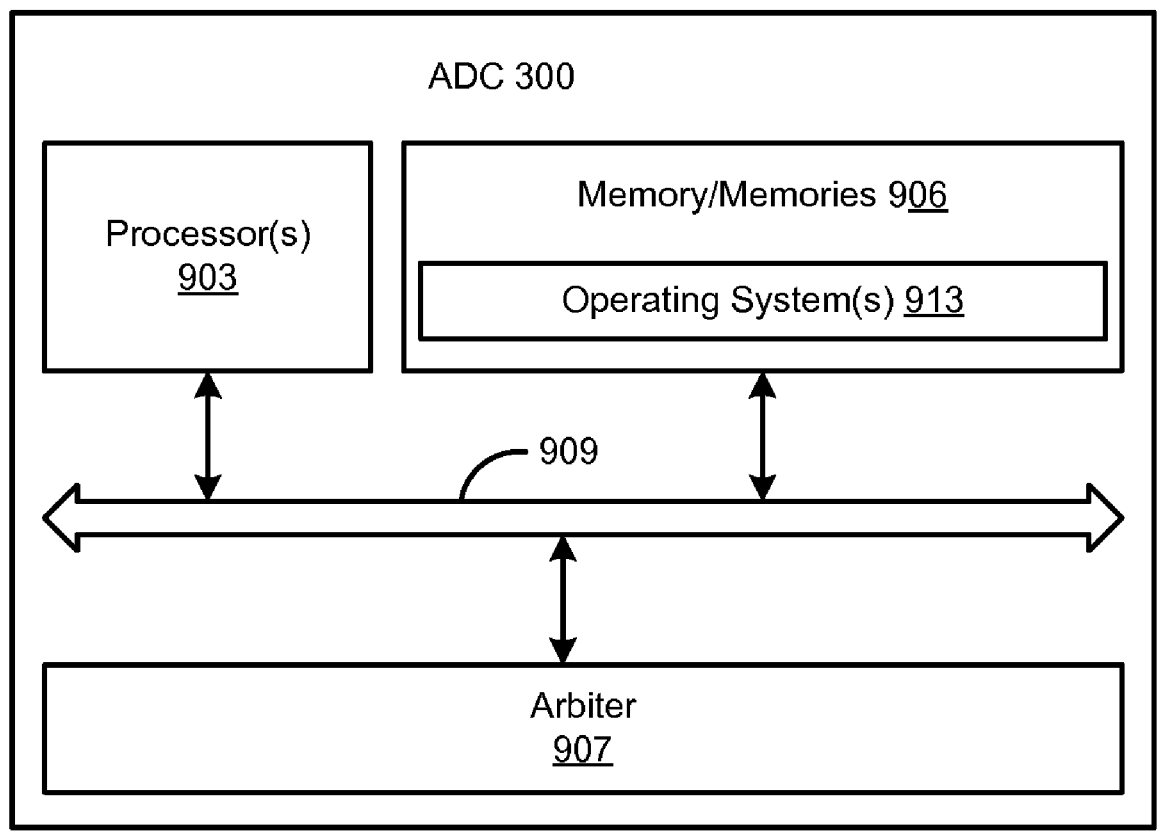
FIG. 7 depicts an exemplary embodiment of an advanced digital signal processing card in accordance with the disclosure.

With reference to FIG. 7, shown is one additional example of an ADC 204/504 that includes an embedded system, one or more digital signal processors, computer, and/or equivalent device according to an embodiment of the present disclosure. In implementing the above described embodiments, the advanced digital signal processing card 204/504 may include one or more processor circuits having a processor 903, a memory 906, and an FPGA arbiter 907 which are coupled to a local interface or bus 909. In this respect, the local interface or bus 909 may comprise, for example, a data bus with an accompanying control/address bus as can be appreciated.

Stored on the memory 906 and executable by the processor 903 are various components such as an operating system 913. In addition, it is understood that many other components may be stored in the memory 906 and executable by the processor (s) 903. Also, such components may reside in a memory that is external from the distribution substation 103 as can be appreciated. It should also be noted that the DSP's 302 may also include additional ports that for additional external connectivity, memory interfaces, or other ports that are not shown as they are not necessary for an appreciation of the disclosed ADC 204 architecture.

As set forth above, a number of components are stored in the memory 906 and are executable by the processor 903. In this respect, the term "executable" refers to a program file that is in a form that can ultimately be run by the processor 903. Examples of executable programs may be, for example, a compiled program that can be translated into machine code in a format that can be loaded into a random access portion of the memory 906 and run by the processor 903, or source code that may be expressed in proper format such as object code that is capable of being loaded into a random access portion of the memory 906 and executed by the processor 903. An executable program may be stored in any portion or component of the memory 906 including, for example, random access memory, read-only memory, a hard drive, compact disk (CD), floppy disk, or other memory components.

The memory 906 is defined herein as volatile and/or nonvolatile memory and data storage components. Volatile components are those that do not retain data values upon loss of power. Nonvolatile components are those that retain data upon a loss of power. Thus, the memory 906 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In addition, the processor 903 may represent multiple processors and the memory 906 may represent multiple memories that operate in parallel. In such a case, the local interface 909 may be an appropriate network that facilitates communication between any two of the multiple processors, between any processor and any one of the memories, or between any two of the memories, etc. The processor 903 may be of electrical, optical, or of some other construction as can be appreciated by those with ordinary skill in the art.

The operating system 913 is executed to control the allocation and usage of hardware resources such as the memory and processing time in the server 103. In this manner, the operating system 913 serves as the foundation on which applications depend as is generally known by those with ordinary skill in the art.

The flow charts of FIG. 6 show the functionality and operation of an implementation of an ADC 204/504. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flow chart of FIG. 6 shows a specific order of execution, it is understood that the order of execution may differ from that which is depicted. For example, the order of execution of two or more blocks may be scrambled relative to the order shown. Also, two or more blocks shown in succession in FIG. 6 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, where the functionality of the disclosed systems are expressed in the form of software or code, it can be embodied in any computer-readable medium for use by or in connection with an instruction execution system such as, for example, a processor in a computer system or other system. In this sense, the functionality may comprise, for example, statements including instructions and declarations that can be fetched from the computer-readable medium and executed by the instruction execution system. In the context of the present disclosure, a "computer-readable medium" can be any medium that can contain, store, or maintain the executable software for use by or in connection with the instruction execution system.

The computer readable medium can comprise any one of many physical media such as, for example, electronic, magnetic, optical, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Although the functionality of various embodiments are described above with respect to the drawings as being embodied in software or code executed by general purpose hardware as discussed above, as an alternative the same may also be embodied in dedicated hardware or a combination of software/general purpose hardware and dedicated hardware. If embodied in dedicated hardware, the functionality of these components can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

It should be emphasized that the above-described embodiments of the present disclosure are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

Therefore, the following is claimed:

1. A digital signal processing system, comprising:
a plurality of digital signal processors (DSP's) in a power line carrier system transceiver, the DSP's configured to receive a three phase waveform in a power distribution system, the DSP's further configured to extract digital data embedded in the three phase wave form with a frequency-shift keying modulation scheme, the digital data received from a usage metering device in a customer endpoint, the usage metering device configured to transmit electricity usage data in a customer endpoint, wherein at least one of the DSP's having an external memory, the DSP's further configurable to substantially simultaneously act as a master processor and as a slave processor relative to another DSP of the plurality, each of the DSP's further having a slave port and a master port, the slave port configured to transmit data from the external memory of a slave processor and the master port configured to access data on behalf of a master processor;
an arbiter, the arbiter including a field programmable gate array;
a bus coupled to at least one of the DSP's and the arbiter; wherein a first DSP configured as a master processor has exclusive access to the external memory of another DSP of the plurality; and
a single board computer configured to receive the extracted electricity metering data from the plurality of DSP's, the single board computer and communicate the electricity metering data to a central billing system; wherein
the arbiter is configured to maintain DSP status data, the DSP status data reflecting which of the DSP's is configured as a slave processor and the identity of the master processor configured to access the external memory of slave processor DSP's, the DSP status data further includes a slave busy flag corresponding to each of the plurality of DSP's, the slave busy flag set by a DSP claimed as a slave processor by another DSP of the plurality, the DSP status data further including a master processor identifier corresponding to each of the plurality of DSP's, the master processor identifier of a first DSP set by the arbiter to reflect the identity of a DSP of the plurality claiming the first DSP as a slave processor;
requests to access the external memory of the slave processor DSP's and data from the external memory of slave processor DSP's are communicated along the bus;
responsive to a first request from the first DSP to claim the second DSP as a slave processor, the arbiter is configured to deny the first request if the second DSP is claimed as a slave processor by a third DSP; and
the master processor has exclusive access to the external memory of the slave processor relative to other DSP's of the plurality.

2. A digital signal processing system, comprising:
a plurality of digital signal processors (DSP's) in a power line carrier system transceiver, the DSP's configured to receive a three phase waveform in a power distribution system, the DSP's further configured to extract digital data embedded in the three phase wave form with a frequency-shift keying modulation scheme, the digital data received from a usage metering device in a customer endpoint, the usage metering device configured to transmit electricity usage data in a customer endpoint, wherein, at least one of the DSP's having an external memory, the DSP's further configurable to act as a master processor and as a slave processor relative to another DSP of the plurality;
a single board computer configured to receive the extracted electricity metering data from the plurality of DSP's, the single board computer and communicate the electricity metering data to a central billing system;
an arbiter, the arbiter including a field programmable gate array; and
a bus coupled to each of the DSP's and the arbiter; wherein,
a first DSP configured as a master processor has exclusive write access to the external memory of another DSP of the plurality; and
the arbiter is configured to maintain DSP status data, the DSP status data reflecting which of the DSP's is configured as a slave processor and the identity of the master processor configured to access the external memory of slave processor DSP's.

3. The method of claim 2, the DSP's are configurable to act as a master processor and a slave processor substantially simultaneously.

4. The digital signal processing system of claim 2, wherein each of the plurality of DSP's further comprises a slave port and a master port, the slave port configured to transmit data from the external memory of a slave processor and the master port configured to access data on behalf of a master processor.

5. The digital signal processing system of claim 2, wherein requests to access the external memory of slave processor DSP's and data from the external memory of slave processor DSP's are communicated along the bus.

6. The digital signal processing system of claim 2, wherein the first DSP configured as a master processor transmits requests to the arbiter to access the external memory of a slave processor.

7. The digital signal processing system of claim 4, wherein the first DSP accesses the external memory of the slave processor via the master port of the first DSP and the slave port of the slave processor.

8. The digital signal processing system of claim 2, wherein the DSP status data further comprises a slave busy flag corresponding to each of the plurality of DSP's, the slave busy flag set by a DSP claimed as a slave processor by another DSP of the plurality.

9. The digital signal processing system of claim 2, wherein the DSP status data further comprises a master processor identifier corresponding to each of the plurality of DSP's, the master processor identifier of a first DSP set by the arbiter to reflect the identity of a DSP of the plurality claiming the first DSP as a slave processor.

10. The digital signal processing system of claim 2, wherein responsive to a first request from the first DSP to claim a second DSP as a slave processor, the arbiter is configured to deny the first request if the second DSP of the plurality is claimed as a slave processor by a third DSP.

11. The digital signal processing system of claim 2, wherein a master processor has exclusive access to the external memory of a slave processor relative to other DSP's of the plurality.

12. A method for communicating among digital signal processors, comprising the steps of:
   in a power line carrier system transceiver, receiving a three phase waveform in a power distribution system in a first digital signal processor (DSP), the DSP configured to extract digital data embedded in the three phase waveform with a frequency-shift keying modulation scheme, the digital data received from a usage metering device in a customer endpoint, the usage metering device configured to transmit electricity usage data in a customer endpoint;
   receiving, in a field programmable gate array (FPGA) arbiter, a first request from a first digital signal processor (DSP) to claim a second DSP as a slave processor,
   determining, in the FPGA arbiter, whether a third DSP has claimed the second DSP as a slave processor,
   granting the first request if the second DSP is available to be claimed as a slave processor,
   transferring data between the first DSP to the second DSP through the arbiter; and
   transmitting the extracted electricity metering data from the first DSP to a single board computer and communicating the electricity metering data to a central billing system.

13. The method of claim 12, wherein the step of determining whether the third DSP has claimed the second DSP as a slave processor further comprises the steps of:
   retrieving DSP status data corresponding to the second DSP from the arbiter,
   determining whether the DSP status data reflects that the second DSP is busying servicing a master processor, and
   determining whether the DSP status data reflects that the second DSP is claimed by the third DSP as a slave processor.

14. The method of claim 13, wherein the slave processor grants exclusive write access to memory of the slave processor for the master processor.

15. The method of claim 14, wherein data transfers between the master processor and the slave processor occur via the slave port of the slave processor and the mater port of the master processor.

16. The method of claim 13, further comprising the step of:
   updating the DSP status data to reflect that the first DSP has claimed the second DSP as a slave processor.

17. The method of claim 16, wherein the DSP status includes a slave busy status flag and a master processor identifier reflects which DSP has claimed a slave processor.

18. The method of claim 17, wherein the slave busy status flag reflects whether a DSP is busy servicing a master processor and the master processor identifier reflects the identity of the master processor.

19. The method of claim 16, further comprising the step of:
   upon completion data transfers between the first DSP and the second DSP, updating the DSP status data to reflect that the second DSP is not claimed as a slave processor.

20. The method of claim 12, wherein responsive to a first request from the first DSP to claim the second DSP as a slave processor, denying the first request if the second DSP of the plurality is claimed as a slave processor by the third DSP.

* * * * *